United States Patent [19]
Suwa et al.

[11] Patent Number: 5,916,623
[45] Date of Patent: *Jun. 29, 1999

[54] PROCESSED FAT AND OIL COMPOSITION

[75] Inventors: Nobuyuki Suwa; Tomokazu Hirose, both of Kanagawa, Japan

[73] Assignee: Mitsubishi Chemical Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/634,387

[22] Filed: Apr. 18, 1996

[30] Foreign Application Priority Data

Apr. 19, 1995 [JP] Japan ..................... 7-093794

[51] Int. Cl.⁶ .................................. A23D 9/007
[52] U.S. Cl. ............................ 426/611; 426/601
[58] Field of Search ................... 426/611, 601, 426/553, 558

[56] References Cited

U.S. PATENT DOCUMENTS

| | | | |
|---|---|---|---|
| 3,170,796 | 2/1965 | Andre | 426/553 |
| 3,404,985 | 10/1968 | Strobel | 426/553 |
| 3,533,802 | 10/1970 | Cooper | 426/558 |
| 3,600,186 | 8/1971 | Mattson | 426/611 |
| 3,649,647 | 3/1972 | Ota | 426/611 |
| 3,914,453 | 10/1975 | Gawrilow | 426/553 |
| 4,250,202 | 2/1981 | Hartnett | 426/553 |
| 4,419,377 | 12/1983 | Seward | 426/553 |
| 4,456,626 | 6/1984 | Nelson | 426/553 |
| 4,835,001 | 5/1989 | Mijac | 426/553 |
| 4,857,358 | 8/1989 | Okumura | 426/553 |
| 4,880,657 | 11/1989 | Guffey | 426/611 |
| 4,919,964 | 4/1990 | Adams | 426/611 |
| 4,952,687 | 8/1990 | Bodor | 426/611 |
| 4,960,602 | 10/1990 | Talkington | 426/611 |
| 5,017,398 | 5/1991 | Jandacek | 426/611 |
| 5,021,256 | 6/1991 | Guffey | 426/611 |
| 5,039,544 | 8/1991 | Lansbergen | 426/553 |
| 5,236,733 | 8/1993 | Zimmerman | 426/611 |
| 5,248,509 | 9/1993 | Bruin | 426/611 |
| 5,254,356 | 10/1993 | Busken | 426/553 |
| 5,314,707 | 5/1994 | Kester | 426/611 |
| 5,514,405 | 5/1996 | Yokomichi | 426/611 |
| 5,773,073 | 6/1998 | Matsuda | 426/601 |

FOREIGN PATENT DOCUMENTS

| | | | |
|---|---|---|---|
| 0257714 | 3/1988 | European Pat. Off. . | |
| 0291106 | 11/1988 | European Pat. Off. | 426/611 |
| 0562140 | 9/1993 | European Pat. Off. . | |
| 59-25645 | 2/1984 | Japan . | |
| 62-186745 | 8/1987 | Japan . | |
| 63-287438 | 11/1988 | Japan . | |
| 91/15960 | 10/1991 | WIPO | 426/611 |
| WO 91/18514 | 12/1991 | WIPO . | |

OTHER PUBLICATIONS

Becker Emulsions: Theory and Practice Reinhold Publishing Corp New York pp. 166–167, 188–190.
Akol Carbohydrate Polyesters as Fat Substitutes Marcel Dekke Inc New York pp. 111–112.

*Primary Examiner*—Carolyn Paden
*Attorney, Agent, or Firm*—Sughrue, Mion, Zinn Macpeak & Seas, PLLC

[57] ABSTRACT

The present invention provides a processed fat and oil composition comprising (1) fat and oil, (2) a polyglycerol saturated fatty acid ester having an average degree of esterification of 40% or higher, wherein at least 70% by weight of the fatty-acid moieties are derived from a saturated fatty acid, and (3) an unsaturated fatty acid ester, wherein at least 60% by weight of the fatty-acid moieties are derived from an unsaturated fatty acid. The processed fat and oil composition is used as a processed fat and oil composition for foods, particularly, for producing baked confectionery containing an egg component.

23 Claims, No Drawings

PROCESSED FAT AND OIL COMPOSITION

FIELD OF THE INVENTION

The present invention relates to a processed fat and oil composition for foods. More particularly, this invention relates to a processed fat and oil composition suitably used for producing baked confectionery containing an egg component.

BACKGROUND OF THE INVENTION

Properties of processed fats and oils for foods represented by margarines and shortenings vary depending on the kind of the raw fat and oil composition and the kind of the emulsifier used. Such processed fats and oils are also required to have various performances according to their uses.

Baked confectioneries including cakes, cookies, and biscuits are produced mainly from wheat flour, sugar, an egg component, water, fat and oil, etc. In a generally employed process for producing these baked foods, a dough is first produced by the so-called "sugar batter" process comprising mixing fat and oil with sugar, whipping the mixture, gradually adding eggs thereto to form an emulsion, and then mixing the emulsion together with wheat flour. This dough is then molded into an appropriate shape and baked.

The qualities required for baked confectionery include a satisfactory in the degree of baking, internal texture, surface marks of bubbles, meltability in the mouth, etc. In addition, performance requirements necessary in processes for producing, for example, cookies include easiness of creaming in the step of mixing a margarine, shortening, or the like, with sugar, moderate emulsifiability and dough stability in the step of adding egg whites, dough stability after wheat flour addition, and the spreadability of the dough.

To make improvements in such requirements, a technique for enhancing the emulsion stability of a margarine with whole eggs by adding an acetylated sucrose-fatty acid ester to the margarine is discussed in JP-A-59-25645. (The term "JP-A" as used herein means an "unexamined published Japanese patent application.") In JP-A-62-186745 is discussed a highly egg-absorbing fat and oil composition containing a sucrose unsaturated fatty acid ester having an HLB of 5 or lower. Further, another highly egg-absorbing fat and oil composition is discussed in JP-A-63-287438, which contains a combination of a propylene glycol fatty acid ester and another fatty acid ester.

With the recent trend toward higher grades and diversification in the tastes of consumers, the taste for baked confectionery is shifting from baked foods produced using whole eggs to baked foods produced using whole eggs enriched with egg whites or using egg whites alone. For example, baked foods such as langue de chat cookies, French balls, and egg white cakes are characterized, e.g., by the color tone thereof which is free from yellowness due to a reduced proportion of egg yolks or non-use thereof or which can be a bright hue when a coloring ingredient has been incorporated; by a feasible reduction in the content of cholesterol, which is contained in a large amount in egg yolks; and by the cost advantage due to use of egg whites, which are more inexpensive than egg yolks, as the main egg component.

However, with respect to the conventional baked confectioneries produced using egg white-enriched whole eggs or using egg whites alone as the only egg component, processed fats and oils do not sufficiently satisfy the desired performances.

In producing baked confectioneries containing whole eggs, the dough has satisfactory stability and is free from the separation of an egg component therefrom whether wheat flour has been incorporated or not, because lipids such as yolk lecithin contribute to emulsification of a mixture of fat and oil, the egg components, and other ingredients. In contrast, in producing egg white-enriched baked confectioneries, dough stability is difficult to ensure because of insufficient emulsification, and also the dough is reduced in gas-holding property, which is important for increasing the volume of baked foods. In addition, there are problems, for example, that egg white separation from the dough occurs to cause unevenness of baking, that dough sagging occurs during baking to impair the shape of final products, that the baked foods obtained have a rough surface texture, and that scorching begins too early due to excessive water elimination to impair the value of the baked goods.

Dough stability is important in the production of baked confectionery, especially in the case of the so-called langue de chat cookies and the like for which thin dough shaped to about 2 mm thick is baked.

A further problem is that when powerful mixing is carried out for homogenization, the amount of the egg white separated from the emulsified fat and oil is too small and, hence, transfer of water to the wheat flour added later becomes insufficient, so that water elimination from the dough becomes insufficient and this tends to result in half-baking.

SUMMARY OF THE INVENTION

An object of the present invention is to provide a processed fat and oil composition for foods, which has excellent emulsion stability, in particular to provide a processed fat and oil composition which is suitable for use in producing baked confectioneries containing an egg component and enables excellent dough stability and efficient baking in the baking step, and with which baked confectioneries having a homogeneous structure with a satisfactory appearance and a satisfactory internal texture can be obtained even from ingredients enriched with egg white.

The present invention provides a processed fat and oil composition comprising (1) fat and oil, (2) a polyglycerol saturated fatty acid ester having an average degree of esterification of 40% or higher, wherein at least 70% by weight of the fatty-acid moieties thereof are derived from a saturated fatty acid, and (3) an unsaturated fatty acid ester, wherein at least 60% by weight of the fatty-acid moieties thereof are derived from an unsaturated fatty acid.

DETAILED DESCRIPTION OF THE INVENTION

The fatty-acid moieties of the polyglycerol saturated fatty acid ester (the polyglycerol saturated fatty acid ester is hereinafter often referred to as "saturated PoGE") for use in the present invention are mainly derived from at least one saturated fatty acid. Specifically, at least 70% by weight, preferably at least 75% by weight, of the fatty-acid moieties are derived from a saturated fatty acid. The saturated fatty acid preferably has from 12 to 22 carbon atoms. Examples of the saturated fatty acid include lauric acid, myristic acid, palmitic acid, stearic acid, arachic acid, and behenic acid, which may be used alone or as a mixture of two or more in an arbitrary proportion. From the standpoints of flavor and emulsifying ability, palmitic acid and stearic acid are preferable.

The polyglycerol for use in producing the saturated PoGE has a main chain having an average degree of polymerization of 4 or higher, preferably from 6 to 10, from the standpoints of easiness of the control of the degree of esterification and the safety of foods.

The average degree of polymerization (n) of the polyglycerol main chain is the weight average degree of polymerization, which is obtained as follows. The polyglycerol saturated fatty acid ester is hydrolyzed with 0.5 N potassium hydroxide and the resulting polyglycerol is recovered. The hydroxyl value (OHV) of the polyglycerol is measured and the average degree of polymerization is calculated from the OHV based on the following equation in view of the relation with the theoretical value. The hydroxyl value is measured in accordance with *Kijyun Yushi Bunseki Shikenho* (published by Nihonyukagakukyokai).

Molecular weight (MV)=74n+18

Hydroxyl value (OHV)=56110 (n+2)/MW

The saturated PoGE preferably has an average degree of esterification of 40% or higher, usually from 40 to 90%. If the average degree of esterification thereof is lower than 40%, the ester has weakened emulsifying ability for a water-in-oil type (W/O) emulsification, so that emulsification is difficult when the proportion of egg whites is large. On the other hand, average degrees of esterification thereof higher than 90% are undesirable in that the ester, in this case also, has weakened emulsifying ability for W/O emulsification. The average degree of esterification of a polyglycerol fatty acid ester as used herein is defined by the following equation.

Average degree of esterification (%)

$$= \frac{\text{(the number of moles of fatty-acid moieties)}}{\text{(the number of moles of all hydroxyl groups of the polyglycerol before esterification)}} \times 100$$

The average degree of esterification (%) can be calculated based on the following equation by measuring the hydroxyl value (OHV), saponification value (SV), and acid value (AV) of PoGE.

Average degree of esterification (%)

$$= \frac{(SV - AV) \times 100}{OHV + SV - AV}$$

Examples of the unsaturated fatty acid ester include fatty acid esters of a polyglycerol, sucrose, glycerol, and sorbitan, in which at least 60% by weight, preferably at least 70% by weight, of the fatty-acid moieties are derived from at least one unsaturated fatty acid. (The polyglycerol unsaturated fatty acid ester will hereinafter be often referred to as "unsaturated PoGE.") In the present invention, these unsaturated fatty acid esters may be used alone or in combination of two or more thereof.

The polyglycerol for use in producing the unsaturated PoGE has a main chain having an average degree of polymerization of 4 or higher, preferably from 6 to 10, from the standpoints of controlling the degree of esterification and safety of foods. The fatty-acid moieties of the ester are preferably derived from an unsaturated fatty acid having 12 to 22 carbon atoms. Examples of the unsaturated fatty acid include palmitoleic acid, oleic acid, linoleic acid, and erucic acid, which may be used alone or as a mixture of two or more in an arbitrary proportion. Especially preferred of these from the standpoints of flavor and emulsifying ability are oleic acid and erucic acid. The average degree of esterification of the unsaturated PoGE is preferably 40% or higher, more preferably from 40 to 80%. The definition of the average degree of esterification of the unsaturated PoGE is the same with that of the saturated PoGE.

The fatty-acid moieties of the sucrose unsaturated fatty acid ester are preferably derived from an unsaturated fatty acid having 16 to 22 carbon atoms. Examples of such fatty acid include palmitoleic acid, oleic acid, linoleic acid, and erucic acid, which may be used alone or as a mixture of two or more in an arbitrary proportion. From the standpoints of flavor and emulsifying ability, oleic acid and erucic acid are particularly preferable. The sucrose unsaturated fatty acid ester preferably has an average degree of esterification of from 4 to 7 and has lipophilicity. The average degree of esterification of sucrose unsaturated fatty acid ester as used herein is defined by the following equation.

Average degree of esterification $$= \frac{\text{the number of moles of fatty acid required for esterification}}{\text{the number of moles of sucrose molecules}}$$

The glycerol unsaturated fatty acid ester is a mono- and/or diester of glycerol. The fatty-acid moieties thereof are preferably derived from an unsaturated fatty acid having 16 to 22 carbon atoms. Examples of the ester include glycerol monooleate and glycerol monolinoleate, which may be used alone or as a mixture of two or more in an arbitrary proportion.

The sorbitan unsaturated fatty acid ester is a sorbitan mono-, di-, or triester or a mixture thereof. The fatty-acid moieties thereof are preferably those derived from an unsaturated fatty acid having 16 to 22 carbon atoms. Examples of such fatty acid include palmitoleic acid, oleic acid, linoleic acid, and erucic acid, which may be used alone or as a mixture of two or more in an arbitrary proportion. Particularly, sorbitan trioleate is preferably used.

Each of these fatty acid esters can be obtained by introducing the corresponding fatty acid and alcohol in a predetermined molar ratio into a reactor and heating the reactants at ordinary, an increased, or an decreased pressure to conduct an esterification reaction. An alkali metal hydroxide, e.g., sodium hydroxide, or an alkali metal carbonate, e.g., potassium carbonate, is generally used as an esterification catalyst in an amount of from about 0.01 to about 0.1% by weight based on the amount of the starting compounds. A commercial fatty acid ester product may also be employed as it is as the fatty acid ester for the present invention.

The blending ratio of the saturated PoGE and the unsaturated fatty acid ester is desirably from 2:8 to 8:2, preferably from 3:7 to 7:3, by weight. If the blending ratio thereof is outside the above range, emulsifiability of egg white into fat and oil is insufficient, so that it is difficult to obtain adequate dough stability and, hence, satisfactory baked confectioneries are hardly obtained.

The amount of the saturated PoGE and the unsaturated fatty acid ester to be added to the fat and oil is usually 0.1% by weight or larger based on the amount of the fat and oil. The upper limit of the amount thereof is preferably 5% by weight from the standpoints of the flavor and cost of the final product. Especially preferred range of the amount thereof is from 0.1 to 3% by weight. If the amount thereof is too small, it is difficult to obtain the desired dough stability and satisfactory baked confectioneries are hardly obtained. The saturated PoGE and the unsaturated fatty acid ester may be added to the fat and oil by, for example, mixing the saturated PoGE and the unsaturated fatty acid ester under heating at 50 to 60° C. and then adding the resulting mixture to the fat and oil. Alternatively, each of the saturated PoGE and the unsaturated fatty acid ester is separately added to the fat and oil, heated at 50 to 60° C., and then the resulting two mixtures are mixed with a mixture.

Examples of the raw fat and oil include natural animal fats and oils, natural vegetable fats and oils, and hardened oils, fractionated oils, and transesterificated oils obtained therefrom. These fats and oils are usually used alone or as a mixture of two or more thereof. Specific examples of such fats and oils include animal and vegetable oils such as palm oil, rapeseed oil, soybean oil, coconut oil, palm kernel oil, cotton seed oil, corn oil, safflower oil, milk fat, fish oils, beef tallow, and whale oil, as well as hardened oils, fractionated oils, and transesterificated oils obtained therefrom. These fats and oils may be used alone or as a mixture of two or more thereof. Although there is no particular limitations on selection from these fats and oils, vegetable oils such as palm oil and rapeseed oil are preferably used in these days because these oils have a low cholesterol content and are odorless.

If desired and necessary, another kind of emulsifying agent for foods, e.g., lecithin, may be incorporated into the processed fat and oil composition of the present invention in combination with the esters described above. Except the emulsifying agent, conventional raw materials for ordinary margarine, shortening, etc. may be used in the same manner.

In the case where the processed fat and oil composition of the present invention is used as a margarine, the proportion of the processed fat and oil composition to water is from 90:10 to 60:40 by weight. The margarine may be produced in an ordinary way as follows. An emulsifying agent such as the fatty acid esters is dissolved in a raw fat and oil to produce a processes fat and oil composition. Then, as an aqueous phase, water-soluble ingredients such as a milk component and sodium chloride, and other optional ingredients such as a colorant, a flavoring material, and a stabilizer are added. It is possible to carry out pre-emulsification with a homogenizer or the like before cooling plasticization is performed with a votator or the like to produce the desired product.

In the case where the processed fat and oil composition of the present invention is used as a shortening, the shortening may be produced in an ordinary way by adding an emulsifying agent such as the fatty acid esters to fat and oil with heating and then cooling and plasticizing the mixture.

Egg white-enriched baked confectioneries are baked confectioneries containing, as an egg component, either a combination of whole eggs and egg whites or egg whites alone. In producing an egg white-enriched baked confectionery using the fat and oil composition of the present invention, an ordinary process may be employed. For example, the baked food can be produced by whipping a mixture of the processed fat and oil composition of the present invention and sugar in a mixer, gradually adding egg whites to the whipped mixture to effect emulsification, subsequently mixing the emulsion with wheat flour to prepare a dough, and then molding the dough into an adequate shape, followed by baking in an oven.

Hereinafter, the present invention will be explained in detail by reference to Examples.

Unless otherwise indicated, all parts, ratios, percents, and the like are by weight.

EXAMPLES 1 TO 5 AND COMPARATIVE EXAMPLES 1 TO 8

Each of the emulsifying agents whose compositions are shown in Table 1 in an amount of 6 g was dissolved in 1,224 g of a mixed fat and oil consisting of 50% by weight of hardened rapeseed oil, 40% by weight of palm oil, and 10% by weight of rapeseed oil, thereby giving an oil phase. Subsequently, a brine prepared by dissolving 3 g of sodium chloride into 267 g of water was added to each oil phase at a temperature of 40° C. with stirring by means of a stirrer to conduct pre-emulsification. Each mixture was then cooled and kneaded with an agihomomixer (manufactured by Tokushu Kika Kogyo Co., Ltd., Japan) to produce 1,500 g of a margarine.

Using each of the thus-obtained margarines, langue de chat cookies were produced by the method described later to evaluate dough stability, baking time, and cookie surface state. The results obtained are shown in Table 1.

TABLE 1

| | Emulsifying Agent | | | | | | |
| --- | --- | --- | --- | --- | --- | --- | --- |
| | A. Polyglycerol fatty acid ester | B. Unsaturated fatty acid ester | A/B (by weight) | Dough stability | Baking time (min.) | Cookie surface state | Feeling in the mouth |
| Example | | | | | | | |
| 1 | 10G5S*[1] | 10G6ER*[5] | 50/50 | Good | 7.0 | Good | Good |
| 2 | 10G10P*[2] | 6G5O*[6] | 33/67 | Good | 7.0 | Good | Good |
| 3 | 10G10S*[3] | ER-190*[7] | 67/33 | Good | 6.5 | Good | Good |
| 4 | 10G10S | ER-190 + Emulsy-MU*[8] | 67/33 | Good | 6.5 | Good | Good |
| 5 | 6G5S*[4] | Emulsy-MU | 50/50 | Good | 6.5 | Good | Good |
| Comparative Example | | | | | | | |
| 1 | — | 10G6ER | 0/100 | Poor | 6.5 | Poor (1) | Poor (1) |
| 2 | — | ER-190 | 0/100 | Poor | 6.5 | Poor (1) | Poor (1) |
| 3 | — | Emulsy-MU | 0/100 | Poor | 6.0 | Poor (1) | Poor (1) |
| 4 | — | Emusol O-30 + Emulsy-MU*[9] | 0/100 | Poor | 6.0 | Poor (1) | Poor (1) |
| 5 | 6G5S | — | 100/0 | Good | 8.0 | Poor (2) | Poor (2) |

TABLE 1-continued

| | Emulsifying Agent | | | | | | |
|---|---|---|---|---|---|---|---|
| | A. Polyglycerol fatty acid ester | B. Unsaturated fatty acid ester | A/B (by weight) | Dough stability | Baking time (min.) | Cookie surface state | Feeling in the mouth |
| 6 | 10G5S | — | 100/0 | Good | 7.5 | Poor (2) | Poor (2) |
| 7 | 10G10S | — | 100/0 | Good | 8.0 | Poor (2) | Poor (2) |
| 8 | 10G10P | — | 100/0 | Good | 7.5 | Poor (2) | Poor (2) |

*¹10G5S, decaglycerol pentastearate (obtained by reacting under heating stearic acid (purity: 80% by weight) and decaglycerol in a molar proportion of 5:1. From OHV, SV, and AV measured, the average degree of esterification was calculated to be 41% by weight. The esters of *² to *⁶ below were prepared in the similar manner.)
*²10G10P, decaglycerol decapalmitate (purity of palmitic acid used as a starting material: 90% by weight; average degree of esterification: 78%)
*³10G10S, decaglycerol decasterate (purity of stearic acid used as a starting material: 80% by weight; average degree of esterification: 78%)
*⁴6G5S, hexaglycerol pentastearate (purity of stearic acid used as a starting material: 80% by weight; average degree of esterification: 60%)
*⁵10G6ER, decaglycerol hexaerucate (purity of erucic acid used as a starting material: 80%; average degree of esterification: 48%)
*⁶6G5O, hexaglycerol pentaoleate (purity of oleic acid used as a starting material: 80% by weight; average degree of esterification: 60%)
*⁷sucrose erucate "Ryoto Sugar Ester ER-190" manufactured by Mitsubishi Chemical Foods Co., Ltd., Japan (content of erucic acid moieties in all fatty-acid moieties: 85%; HLB: 1)
*⁸monoglycerol linoleate "Emulsy-MU" manufactured by Riken Vitamin Co., Ltd., Japan (content of linoleic acid moieties in all fatty-acid moieties: 75%)
*⁹sorbitan trioleate "Emusol O-30" manufactured by Kao Corp., Japan (content of oleic acid moieties in all fatty-acid moieties: 85%)

The proportion of ER-190/Emulsy-MU in Example 4 and that of Emusol O-30/Emulsy-MU in Comparative Example 4 was 1:1 by weight, respectively.

(Method for Producing Langue De Chat Cookie)

Using Kenmix Mixer (manufactured by Aiko-sha Seisakusho, Japan), 208 g of a margarine was mixed with 208 g of sugar. Then, 230 g of egg white was added in five portions. From the resulting mixture, a 150 g portion was taken out as a sample dough for dough stability evaluation as described later (this sample dough is referred to as "stabilized dough intermediate"). The remaining dough was mixed with 160 g of soft flour to prepare a cookie dough. Subsequently, this cookie dough was formed into circular shapes each having a diameter of 5.5 cm and a thickness of 2 mm, and twenties of the shaped dough were baked by twenties at 180° C. for 6 to 8 minutes.

(Evaluation Methods)

<Dough Stability>

A 100 g portion of each stabilized dough intermediate was placed in a conical funnel with a net at the bottom for the prevention of dough dropping. This funnel was allowed to stand in a 20° C. thermostatic chamber for 2 hours. Thereafter, the amount of the egg white which had dropped onto a receiver vessel was measured.

| Good: | the amount of separated egg white is below 20 g |
|---|---|
| Poor: | the amount of separated egg white is 20 g or larger |

<Baking Time>

The dough were visually examined for the state of baking, and the time when the periphery of each cookie came to have a ring-like brown scorch was taken as the end point of the baking. The time period to this end point was measured.

<Cookie Surface State>

The baked cookies were cooled, and the baked surface state was then examined.

| Good: | satisfactory appearance with smooth surface state |
|---|---|
| Poor (1): | rough surface state with many small holes (marks made by the gas which had gone out of bubbles) |
| Poor (2): | half-baked state due to poor water elimination from the center part, in spite of the peripheral scorching |

<Feeling in the Mouth>

The baked cookies were subjected to a sensory test by five panelists.

Good: soft feeling with teeth, and satisfactory meltability in the mouth

Poor (1): hard feeling with teeth, and poor meltability in the mouth

Poor (2): difficult to cut with teeth, and poor meltability in the mouth

By using the fat and oil composition of the present invention, a dough having excellent stability can be obtained. Even for forming an egg white-enriched baked confectionery, this dough can provide efficient and satisfactory baking, is free from the burning caused by separation of an aqueous ingredient or from the sagging and deformation caused by poor water elimination, and never yields a half-baked product. As a result, baked confectioneries satisfactory in both appearance and internal texture can be produced.

While the invention has been described in detail and with reference to specific embodiments thereof, it will be apparent to one skilled in the art that various changes and modifications can be made therein without departing from the spirit and scope thereof.

What is claimed is:

1. A fat and oil composition comprising:
   (1) fat and oil,
   (2) a polyglycerol saturated fatty acid ester having an average degree of esterification of from 40% to 90%, wherein at least 70% by weight of the fatty acid moieties thereof are derived from a saturated fatty acid, and (3) an unsaturated fatty acid ester selected for the group consisting of a polyglycerol ester having an average degree of esterification of from 40 to 80%, a sucrose ester having an average degree of esterificiation of from 4 to 7, a glycerol ester which is a monoester of glycerol, a diester of glycerol, or a mixture of the monoester of glycerol and the diester of glycerol, and a sorbitan ester, wherein at least 60% by weight of the fatty acid moieties thereof are derived from an unsaturated fatty acid, where the proportion of said polyglycerol saturated fatty acid ester (2) to said unsaturated fatty acid ester (3) is from 2:8 to 8:2 by weight, and wherein the content of said polyglycerol saturated fatty acid ester (2) and said unsaturated fatty acid ester (3) is from 0.1 to 5% by weight based on the fat and oil.

2. The fat and oil composition as claimed in claim 1, wherein at least 75% by weight of the fatty acid moieties of said polyglycerol saturated fatty acid ester (2) are derived from a saturated fatty acid.

3. The fat and oil composition as claimed in claim 1, wherein the saturated fatty acid moieties of said polyglycerol saturated fatty acid ester have 12 to 22 carbon atoms.

4. The fat and oil composition as claimed in claim 1, wherein the polyglycerol main chain of said polyglycerol saturated fatty acid ester (2) has an average degree of polymerization of 4 or higher.

5. The fat and oil composition as claimed in claim 1, wherein the polyglycerol main chain of said polyglycerol saturated fatty acid ester (2) has an average degree of polymerization of from 6 to 10.

6. The fat and oil as claimed in claim 1, wherein at least 70% by weight of the fatty acid moieties of said unsaturated fatty acid ester (3) are derived from an unsaturated fatty acid.

7. The fat and oil composition as claimed in claim 1, wherein said unsaturated fatty acid ester (3) is the polyglycerol ester.

8. The fat and oil composition as claimed in claim 7, wherein the polyglycerol unsaturated main chain of said polyglycerol ester (3) has an average degree of polymerization of 4 or higher.

9. The fat and oil composition as claimed in claim 7, wherein the polyglycerol unsaturated main chain of said polyglycerol ester (3) has an average degree of polymerization of from 6 to 10.

10. The fat and oil composition as claimed in claim 7, wherein the unsaturated fatty acid moieties of said polyglycerol unsaturated fatty acid ester (3) are derived from an unsaturated fatty acid having 12 to 22 carbon atoms.

11. The fat and oil composition as claimed in claim 1, wherein said unsaturated fatty acid ester (3) is the sucrose ester.

12. The fat and oil composition as claim in claim 1, wherein said unsaturated fatty acid ester (3) is a member selected from the group consisting of a monoester of sorbitan, a diester of sorbitan, a triester of sorbitan and a mixture of two or more of the monoester of sorbitan, the diester of sorbitan and the triester of sorbitan.

13. The fat and oil composition as claimed in claim 12, wherein the unsaturated fatty acid moieties of said sorbitan unsaturated fatty acid ester (3) are derived from an unsaturated fatty acid having 16 to 22 carbon atoms.

14. The fat and oil composition as claimed in claim 1, wherein said unsaturated fatty acid ester (3) is the sucrose ester.

15. The fat and oil composition as claimed in claim 14, wherein the unsaturated fatty acid moieties of said sucrose unsaturated fatty acid ester (3) are derived from an unsaturated fatty acid having 16 to 22 carbon atoms.

16. The fat and oil composition as claimed in claim 14, wherein said sucrose unsaturated fatty acid ester (3) has an average degree of esterfication of less than 70%.

17. The fat and oil composition as claimed in claim 1, wherein said unsaturated fatty acid ester (3) is a member selected from the group consisting of a monoester of glycerol, a diester of glycerol, and a mixture of the monoester of glycerol and the diester of glycerol.

18. The fat and oil composition as claimed in claim 17, wherein the unsaturated fatty acid moieties of said glycerol unsaturated fatty acid ester (3) are derived from an unsaturated fatty acid having 16 to 22 carbon atoms.

19. The fat and oil composition as claimed in claim 1, wherein the content of said polyglycerol saturated fatty acid ester (2) and said unsaturated fatty acid ester (3) is from 0.1 to 3% by weight based on the fat and oil.

20. The fat and oil composition as claimed in claim 1, wherein the proportion of said polyglycerol saturated fatty acid ester (2) to said unsaturated fatty acid ester (3) is from 3:7 to 7:3 by weight.

21. The fat and oil composition as claimed in claim 1, wherein said composition is a margarine.

22. The fat and oil composition as claimed in claim 1, wherein said composition is a shortening.

23. The fat and oil composition as claimed in claim 1, wherein said composition is used for producing baked confectionery containing an egg component.

* * * * *